United States Patent Office 3,663,501
Patented May 16, 1972

3,663,501
ADHESIVE CEMENT
Robert J. Adams and Wendell C. Overhults, East Brunswick, N.J., assignors to Johnson & Johnson
No Drawing. Filed June 11, 1970, Ser. No. 45,538
Int. Cl. C08f 45/04; A61k 5/02
U.S. Cl. 260—41 R
9 Claims

ABSTRACT OF THE DISCLOSURE

Adhesive compositions comprising a polymerizable monomeric ester of α-cyanoacrylic acid are substantially improved by the addition of about 5 to 25 parts by weight of sodium fluoride. The compositions preferably contain a finely-divided filler, and still further improvement results from the selection of a particular particle size for the filler, e.g., a mixture containing a substantial proportion of about 40–50 and about 90–100 micron size particles. The preferred filler is alumina having about equal proportions of the smaller and larger particle sizes.

These improved adhesive compositions are activated by an amine catalyst, preferred forms being the tertiary amines N,N-dimethyl-p-toluidine and N,N-dimethylaniline. They can be applied to either dry or wet surfaces of a variety of materials. Upon curing, they exhibit enhanced bonding and resistance to wear and long-term deterioration, even under submerged or otherwise moist conditions. They are particularly suitable for the treatment of teeth, e.g., for filling pits, cracks and fissures to prevent caries and for temporary fillings and the preparation of dental restorations.

BACKGROUND OF THE INVENTION

Field of the invention

The present invention relates to improvements in polymerizable monomeric cyanoacrylate cement compositions, preferably containing fillers such as finely-divided alumina, which compositions are advantageously employed, for example, in the treatment of teeth. The improvements include the addition of finely-divided sodium fluoride to the compositions and the selection of particular particle sizes for the filler or fillers employed therein, resulting in unexpected and surprising benefits.

While the compositions of thepresent invention are described in connection with particular embodiments designed primarily for the treatment of teeth, it should be understood that the compositions and their applications are not limited thereto. They can be embodied in the form of adhesive-filling compositions for filling or bonding to a variety of other materials including, for example, ceramics, glass, metal, wood and rubber, and wherever the unique properties of the present composition can be advantageously employed, as will be apparent to those skilled in the art in the light of this disclosure.

Description of the prior art

It has heretofore been proposed to use as adhesives the monomeric esters of alpha cyanoacrylic acid, as described, for example, in U.S. Patent 2,794,788. Although the methyl-α-cyanoacrylate has been used as an all-purpose adhesive, bonding to most surfaces and curing in a relatively short time under normal atmospheric conditions, this is not necessarily true with respect to the other monomeric α-cyanoacrylates. This is illustrated, for example, by monomeric isobutyl α-cyanacrylate which is slow to cure and adheres relatively poorly to many surfaces such as stainless steel, glass and rubber.

In the copending application of Wendell C. Overhults and Richard M. Potts, Ser. No. 719,662, filed Apr. 8, 1968, and entitled "Adhesive Cement," the teachings of which incorporated herein by reference, cement compositions utilizing the monomeric α-cyanoacrylates are described, which compositions, upon curing, possess substantially better adherence to surfaces than shown by the monomer α-cyanoacrylates employed in making the same. These adhesive cement compositions are prepared by admixing the monomeric α-cyanoacrylate with a finely-divided solid filler such as alumina in the presence of catalytic amounts of an amine activator or catalyst. Cement compositions so formed will adhere to a wide variety of surfaces, including tooth surfaces, substantially more tenaciously than the monomeric α-cyanoacrylate used in their preparation. They will also adhere to moist or wet surfaces, where the wetness is due to water. The bond is adversely affected, however, in the case of tooth surfaces which have previously been coated or painted with sodium fluoride solutions, a popular dental preventive procedure today.

Still further improvements in such cement compositions are manifestly desirable. It is therefore a general object of the present invention to provide enhanced properties to adhesive-filling cements of the class considered herein. It is another general object to provide an adhesive-filling cement for use in dry or wet situs and having enhanced bonding properties and resistance to abrasion and long-term deterioration. It is a further object to provide an improved dental adhesive-filling cement suitable for filling pits, cracks and fissures and for preparing dental restorations. It is a further object to provide a dental adhesive-filling cement which may be employed with a minimum of tooth cavity preparation and results in enhanced resistance to decay. It is a still another object to provide a dental cement which will contact underlying tooth surfaces with sodium fluoride without adversely affecting the cement bond. These and other objects of the present invention will become apparent as the detailed description proceeds.

SUMMARY OF INVENTION

It has now been discovered that these objects can be achieved and the cyanoacrylate cement compositions such as disclosed in the aforesaid copending application Ser. No. 719,662 can be substantially improved, particularly where the same are used as dental cements, by the inclusion of small amounts of finely-divided sodium fluoride in the cement composition, e.g., about 5 to 25% by weight based on total cement. Rather than adversely affecting the bond, as might be expected in view of the decreased adhesion experienced with surfaces prepainted with sodium fluoride, the finely-divided sodium fluoride incorporated in the cement substantially improves the bond and otherwise enhances the properties of the cement.

Improved bonding and longer tooth adherence are unexpectedly also obtained by using as a filler a mixture or blend of fine and relatively coarse size particles, e.g., roughly equal proportions of about 40–50 micron size filler and about 90–100 micron size filler. The filler preferably, but not necessarily, contains catalytic amounts of the amine activator and is stabilized against loss of activity by pretreating the filler with a non-catalytic trialkoxysilyl compound. Each of the components in the various embodiments of the cement compositions is more fully described hereinafter.

The polymerizable monomer binder

The binder for the adhesive cement composition may be any of the adhesive monomeric esters of α-cyanoacrylic acid described in the aforementioned U.S. Patent 2,794,788 and the aforementioned application Ser. No. 719,662. These monomeric cyanoacrylic esters are the monomeric esters of α-cyanoacrylic acid having the general formula:

$$CH_2=C(CN)-C(=O)-OR$$

wherein R is an alkyl group of 1 to 16 carbon atoms, a cyclohexyl group or a phenyl group.

The preferred monomeric cyanoacrylic esters are the alkyl esters of α-cyanoacrylic acid, with the alkyl group containing from about 1 to 10 carbons. It has been observed that as the size of the alkyl group increases the hardness of the resulting cement tends to decrease.

The filler component

As a filler, any finely-divided solid which is substantially inert with respect to the monomeric α-cyanoacrylate binders may be utilized. Thus, one may use inorganic fillers such as finely-divided fused silica, quartz, and aluminum oxide (alumina). Alumina is presently preferred for most purposes. The filler is present in amounts of about 1 to 4 parts by weight of filler for each part by weight of the monomeric α-cyanoacrylate.

Where the cement is to be used as a dental cement, resistance to abrasion and wear is an important factor as is adherence to tooth structure. It has been found that resistance to wear or abrasion and adherence to tooth structure are substantially improved by employing a blend of larger particle size filler, e.g., 90–100 micron particles, and the smaller or finer size filler, e.g., about 40 to 50 micron particles, in the cement. The larger may supplement the finer but preferably are substituted for a portion thereof. A blend is required because the 40–50 micron particles are needed to impart requisite consistency and smoothness to the cement and the 90–100 micron particles are needed to impart enhanced resistance to wear. If only the smaller size is used, resistance to wear suffers; if only the larger size is used, the composition is too gritty. Thus, neither size by itself is wholly satisfactory, at least for dental cements.

Accordingly, about 25 to 75% by weight, based on filler, of each size distribution should be employed in dental cement embodiments. Some proportion, preferably less than 25% of total filler weight, of particle sizes falling outside these particle size distributions can be tolerated. When employing preferred fillers, e.g., alumina and quartz, the mix preferably contains about equal parts by weight of the 40–50 micron and 90–100 micron size particles. To avoid any confusion, it should be understood that the term filler, as used in the specification and claims, is not intended to include the finely-divided sodium fluoride.

The amine activator

As the activator or catalyst for polymerizing the cyanoacrylate binder, any of the basic amine compounds may be used having a $pK_b$ in water of 1 to 12 and in which no nitrogen has more than one attached group exceeding five carbons. The $pK_b$ value is determined in accordance with the procedure set forth by N. F. Hall and M. R. Sprinkle, American Chemical Society, 54, 3469 (1932). The amine must not have more than one substituent group as bulky as a hexyl or phenyl group.

Illustrative of suitable amines are N,N-dimethyl-p-toluidine and N,N - dimethylaniline, N,N - diethylaniline, N - methylbenzylamine, triethanolamine, diethanolamine, 2-picoline, 4-picoline, tributylamine, 4-ethylpyrdine, pyridine, N,N-diethyl-1-naphylamine, hexamethylenediamine, N,N-diethylethylenediamine, preferably N,N-dimethyl-p-toluidine and N,N-dimethylaniline.

When using these amines in the system described herein, essentially no viscosity change in the mixture of filler and monomeric α-cyanoacrylate binder solution occurs until setting time is achieved at which point rapid hardening occurs. Thus, if the setting time is about five minutes, depending on the amount of activator used, the mixture of pretreated finely-divided filler activator and monomeric α-cyanoacrylate maintain essentially the same viscosity through the period from immediately after mixing up until a fraction of a minute prior to setting. Then rapid setting occurs with the mixture going from a fluid, relatively thin paste, to a hard, tightly adherent solid mass in less than a minute.

The components of the cement, including the activator, may all be added and mixed at the same time. However, because the inevitable uneven distribution of the activator may cause the monomer to polymerize too rapidly, the amine activator is preferably initially added in catalytic amounts to the finely-divided filler and the filler so treated then blended with the binder solution which comprises the monomeric α-cyanoacrylate.

Any inert, readily-removable solvent may be used to add the amine activator to the filler, preferred solvents being, for example, organic compounds such as lower boiling ketones and aliphatic and aromatic hydrocarbons. Solutions having a concentration of 0.01 to 1.0% by weight amine activator are generally employed. The amine activator solution is added in small amounts while stirring to assure a uniform coating. The amount of amine activator solution added depends on the particular polymerization time required. In general, the amount of activator present in the cement composition is in the range of about 0.01 to 0.05% by weight of the cement composition, e.g., about 0.02% by weight.

With certain fillers such as quartz and alumina, particularly alumina, the effectiveness of the amine catalyst, after addition thereof to the filler, is dissipated relatively rapidly. With other fillers such as, for example, finely-divided polyethylene, this loss of activity on the part of the amine activator does not occur. Where loss of activity is a problem, the amine-treated filler, unless blended with the monomeric α-cyanoacrylate shortly after preparation, will give varying and inconsistent setting times for the cement so obtained, with essentially no activation occurring after extended periods of storage.

Maintaining effectiveness of activator

In accordance with the teachings of the aforementioned copending application Ser. No. 719,662, this loss of activity on the part of the amine activator is prevented, and stable, activated fillers obtained, by pretreating the filler with a non-catalytic trialkoxysilyl compound having a terminal group represented by the formula:

$$-CH_2-Si(OR)(OR_1)(OR_2)$$

where any of R, $R_1$ or $R_2$ may be a methyl or an ethyl group. When the filler is so treated, the effectiveness of the amine activator is found to remain constant indefinitely.

Illustrative samples of such non-catalytic trialkoxysilyl compounds are:

gamma-methacryloxypropyltrimethoxysilane,
gamma-glycidoxypropyltrimethoxysilane,
triphenylsilane, methyltrimethoxysilane.

The preferred non-catalytic trialkoxysilyl compounds are:

gamma-glycidoxypropyltrimethoxysilane and
gamma-methacryloxypropyltrimethoxysilane.

Where pretreatment with the non-catalytic trialkoxysilyl compound is required, the filler is first treated with a solution of the trialkoxysilyl in a solvent. Any solvent nonreactive with respect to the silyl compound and which can readily be removed by evaporation may be employed, the preferred solvents being organic compounds such as those mentioned above for adding the amine activator. The treating solution should contain at least about 5% by weight of the silyl compound, preferably at least about 10%, the upper limit for satisfactory results being in the range of about 60%. After treatment with the solution of silyl compound the filler is dried by conventional means and then treated with a solution of the amine activator, as above described.

The sodium fluoride component

As above indicated, the improvement of the present invention contemplates, inter alia, adding sodium fluoride in amounts of about 5% to 25% by weight of the total cement composition, preferably about 10 to 20%. The sodium fluoride may supplement the filler or replace a portion thereof.

Additions of the sodium fluoride in amounts of appreciably less than 5% by weight appears to have little or no effect on the properties of the cement composition. As the amount is increased, however, adherence and thus resistance to long-term deterioration are substantially improved. With amounts in excess of 25% by weight, although desired improvements may be retained, substantial difficulty in mixing and handling are encountered.

The sodium fluoride when added should generally have a particle size in the range of about 10 to 100 microns. As aforementioned, when adding the sodium fluoride as a finely-divided component of the cement, the bond is surprisingly improved, whereas it had previously been observed that a pretreatment of tooth surfaces with sodium fluoride decreases the bond. The present composition thus provides an improved cement which creates a bacteriostatic environment (due to the slow release of formaldehyde as the cyanoacrylate breaks down) supplemented by whatever benefits may be associated with the presence of sodium fluoride in the tooth environment.

These combined effects appear to be relatively specific with respect to sodium fluoride. No noticeable improvement in bond strength is obtained, for example, when any of the fluorides such as lithium fluoride, stannous fluoride, or potassium fluoride are used in place of the sodium fluoride. Also, the other halides of sodium such as sodium chloride and sodium bromide appear to be ineffective.

Tinting the cement composition

If the adhesive cement is to be used in dental applications, it may be desirable in some instances to tint the same. This may be done by adding the pigment for tinting to the filler. For some uses a light, slightly gray tint may be desired, rather than the white cements which result when using fillers such as quartz or alumina.

The slightly gray tint may be obtained by including a small amount of finely-divided carbon to the treated filler. If relatively large amounts of carbon are added, however, it tends to interfere with the activation of the binder and again introduces the problem of poor control of the curing time of the binder-filler mix. Accordingly, tinting substances such as carbon should not be added in amounts of more than about 0.15% by weight, the weight percent not exceeding 0.1 if activated carbon is used.

Preparation and use of the cement composition

In a preferred embodiment the pretreated filler containing the amine activator is blended with the sodium fluoride and the monomeric α-cyanoacrylate binder in amounts of, based on weight of the whole, about 40 to 75% filler, about 5 to 25% sodium fluoride, and about 20 to 35% monomeric α-cyanoacrylate. The amine-activated filler should be prepared apart from the sodium fluoride and the activated filler and sodium fluoride then blended together with the monomeric cyanoacrylate binder when preparing the cement just prior to use. For some presently unknown reason, when the sodium fluoride is first mixed with the activated filler and then blended with the cyanoacrylate binder, the bonding to substrates such as teeth, steel, and the like, is not quite as good as the bonding obtained when the components are all mixed together at the same time.

The admixed activated filler, sodium fluoride and binder form a fluid paste having a relatively thin fluid consistency which will wet most surfaces, adhering strongly thereto upon polymerization of the cyanoacrylate binder. The time of setting after mixing of the filler and monomeric binder solution is controlled by the amount of amine activator on the binder.

With most amine activators, shortly after admixing the monomeric α-cyanoacrylate with the pretreated filler, the composition so formed tends to slowly increase in viscosity until the same has finally set into a hard cementitious mass. With the preferred amine activators N,N-dimethyl-para-toluidine and N,N-dimethylaniline, the mix of pretreated filler and monomeric α-cyanoacrylate maintains its initial fluidity until just prior to its setting time, at which a rapid set occurs into a hard cementitious mass.

EXAMPLES

The following examples, which are given for the purpose of illustration only, will help to further illustrate the practice of the invention.

Example 1

The effect on adhesion of the addition of sodium fluoride is illustrated by the test results tabulated in Table 1. In each test the cement composition contained isobutyl α-cyanoacrylate ("IBC") and an alumina filler having equal proportions of 40–50 micron particles and 90–100 micron particles. The filler had previously been coated with gamma-methacryloxypropyltrimethoxysilane to stabilize the subsequently added basic amine activator, i.e., N,N-dimethylaniline. The sodium fluoride had the same particle size distribution in each test, i.e., about 10 to 100 microns.

Adhesion data for both stainless steel to stainless steel and stainless steel to tooth surfaces were determined in accordance with the method described in the article "Static Load Testing of Dental Adhesives," Journal of Dental Research, volume 48, No. 2, March-April 1969, pages 211 through 215. The results are set forth in Table 1 as follows:

TABLE 1

| | Weight percent | | Mean adhesion, p.s.i.* | |
|---|---|---|---|---|
| NaF | IBC | Alumina | Steel to steel | Steel to tooth |
| 0 | 25.0 | 75.0 | 1,370 | 1,280 |
| 5.9 | 23.5 | 70.6 | 1,350 | 1,350 |
| 10.0 | 30.0 | 60.0 | 1,500 | 1,400 |
| 16.7 | 33.3 | 50.0 | 1,930 | 1,720 |
| 25.0 | 33.3 | 41.7 | 1,890 | 1,700 |

*Mean value for about 20-40 determinations.

These data establish that adhesion is increased as much as about 30 to 40% by the addition of the sodium fluoride. Maximum improvement is achieved at sodium fluoride levels above 10% and below 25%.

Example 2

When the composition of the present invention is used as a dental cement, its resistance to wear is an important factor in determining how long a treatment of pits and fissures in teeth remains effective. As aforementioned, this resistance to wear is substantially improved through the inclusion of substantial proportion of larger-particle-size filler in the cement. This is apparent from a series of in vivo tests wherein the effect of particle size on the duration of tooth restoration was noted.

In each test, finely-divided alumina, pretreated for stability and containing catalytic amounts of the basic amine activator, as described in Example 1, was employed. The cement mixture consisted of 75% by weight of the alumina and 25% by weight isobutyl α-cyanoacrylate. In each test, the teeth of human subjects were restored using the cement as a sealant for pits and fissures or as a temporary filling. Prior to application of the cement, the teeth of the subjects were prepared as hereinafter indicated.

In one test series, each subject first rinsed his or her mouth with an oral antiseptic, i.e., a commercially-available mouth wash comprising cetyl pyridinium chloride, oil of peppermint, menthol and alcohol, and then with water. The teeth were isolated with cotton rolls, thoroughly dried with an air syringe and etched for about one minute with phosphoric acid. Each subject then rinsed his or her mouth thoroughly with water to clear the acid from tooth surfaces, following which the teeth were again isolated with cotton rolls and thoroughly dried. Pit and fissure sealant or temporary fillings prepared employing compositions of the present invention were then applied as required by conventional techniques.

Subsequently, the teeth of each subject were inspected at periodic intervals to ascertain whether the restoration was totally lost. The percent of the restorations at each interval which was still reasonably intact is set forth in the tabulation of Table 2, the data being based upon observation of a minimum of 22 treated teeth and usually more:

TABLE 2

| Alumina size, microns | Percent intact restorations after— | | |
|---|---|---|---|
| | 42 days | 86 days | 118 days |
| Blend of 40–50 and 90–100 | 72 | 50 | 41 |
| All 40–50 | 45 | 21 | 18 |

It is apparent that where a blend of 40–50 and 90–100 micron alumina was employed, the resistance to wear as indicated by the percent intact restorations was substantially higher than when only 40–50 micron alumina was employed.

A series of similar tests were carried out except that the teeth of each subject were etched with citric acid rather than phosphoric acid. The percent intact restorations, based upon observing a minimum of 35 treated teeth, are set forth in Table 3 as follows:

TABLE 3

| Alumina size, microns: | Percent intact restorations after 118 days |
|---|---|
| Blend of 40–50 and 90–100 | 59 |
| All 40–50 | 6 |

Again, the blend of the 40–50 and 90–100 micron size alumina gave substantially superior results.

Another series of similar tests were carried out wherein citric acid was again used for etching but in addition thereto the tooth surfaces were silane treated before the cement was added. The silane treatment involved contacting the tooth surfaces with gamma-methacryloxypropyltrimethoxysilane. The results obtained are set forth in Table 4 as follows:

TABLE 4

| Alumina size, microns: | Percent intact restorations after 118 days |
|---|---|
| Blend of 40–50 and 90–100 | 56 |
| All 40–50 | 6 |

Again, superior resistance to wear was obtained when using the blend of 40–50 and 90–100 micron alumina.

From the above description, it is apparent that the objects of the present invention have been achieved. While only certain embodiments have been illustrated, many alternative modifications will be apparent from the above description to those skilled in the art. These and other alternatives are considered within the spirit and scope of the present invention and coverage thereof is intended by the claims of any patents based on this application.

Having described the invention, what is claimed is:

1. In a cement composition comprising at least 20% by weight based on said cement composition of a polymerizable monomeric ester of alpha-cyanoacrylic acid having the general formula:

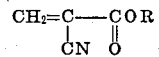

wherein R is an alkyl group of 1 to 16 carbon atoms, a cyclohexyl group or a phenyl group, and a finely-divided filler, the improvement which comprises including as part of said cement composition about 5 to 25% by weight, based on total weight of the cement composition, of finely-divided sodium fluoride.

2. The cement composition of claim 1, wherein said sodium fluoride has a particle size distribution falling in the range of about 10 to 100 microns.

3. The cement compoistion of claim 1 including catalytic amounts of a basic amine activator.

4. The cement composition of claim 1, wherein said filler is alumina.

5. The cement composition of claim 3, wherein said basic amine activator has a $pK_b$ in water of 1 to 12 and no nitrogen having more than one attached group exceeding 5 carbons.

6. The cement composition of claim 3, wherein said amine activator is at least one of the group consisting of N,N-dimethyl-p-toluidine and N,N-dimethylaniline.

7. The cement composition of claim 3 in which said filler contains a coating of triphenylsilane or non-catalytic trialkoxysilyl compound having a terminal group represented by the formula:

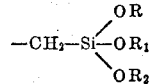

where any of R, $R_1$, and $R_2$ may be a methyl or an ethyl group, and said amine is superimposed thereon.

8. The cement composition of claim 7 in which said trialkoxysilyl compound is at least one of the group consisting of
gamma-glycidoxypropyltrimethoxysilane and
gamma-methacryloxypropyltrimethoxysilane.

9. The cement composition of claim 1 in which the monomeric ester of alpha-cyanoacrylic acid is an alkyl ester in which R is an alkyl group of 2 to 10 carbons.

References Cited

UNITED STATES PATENTS

| 3,503,128 | 3/1970 | Boyd | 260—40 |
| 3,507,822 | 4/1970 | Miyami | 260—17 |
| 3,539,533 | 11/1970 | Lee | 106—35 |
| 2,794,788 | 6/1957 | Coover | 260—17 A |
| 2,784,127 | 3/1957 | Joyner | 260—30.6 |
| 2,756,251 | 7/1956 | Joyner | 260—465.4 |

FOREIGN PATENTS

| 1,122,439 | 8/1968 | Great Britain. |
| 1,511,320 | 1/1968 | France. |
| 257,017 | 9/1967 | Austria. |
| 262,948 | 7/1968 | Austria. |

OTHER REFERENCES

J. Am. Dentistry Assn., July 1967, vol. 75, pp. 121–128.

MORRIS LIEBMAN, Primary Examiner

P. R. MICHL, Assistant Examiner

U.S. Cl. X.R.

32—15; 260—41 A, 41 B